(12) United States Patent
Christmas et al.

(10) Patent No.: US 10,859,821 B2
(45) Date of Patent: Dec. 8, 2020

(54) DISPLAY SYSTEM (71) Applicant: Dualitas Ltd., Buckinghamshire (GB)

(72) Inventors: Jamieson Christmas, Buckinghamshire (GB); Neil Collings, Buckinghamshire (GB)

(73) Assignee: Dualitas Ltd., Buckinghamshire (GB)

(*) Notice: Subject to any disclaimer, the term of this patent is extended or adjusted under 35 U.S.C. 154(b) by 94 days.

(21) Appl. No.: 15/739,118

(22) PCT Filed: Mar. 3, 2017

(86) PCT No.: PCT/GB2017/050586
§ 371 (c)(1),
(2) Date: Dec. 21, 2017

(87) PCT Pub. No.: WO2017/149329
PCT Pub. Date: Sep. 8, 2017

(65) Prior Publication Data
US 2018/0188532 A1  Jul. 5, 2018

(30) Foreign Application Priority Data
Mar. 3, 2016  (GB) .................................. 1603697.2

(51) Int. Cl.
*G03H 1/08* (2006.01)
*G02B 27/01* (2006.01)
(Continued)

(52) U.S. Cl.
CPC ....... *G02B 27/0101* (2013.01); *G03H 1/2205* (2013.01); *G03H 1/2294* (2013.01);
(Continued)

(58) Field of Classification Search
CPC ............. G03H 1/00; G03H 1/08–0808; G03H 1/0841; G03H 1/0866; G03H 1/0891;
(Continued)

(56) References Cited

U.S. PATENT DOCUMENTS 6,185,018 B1   2/2001  Kihara
7,626,912 B2  12/2009  Teraoka
(Continued)

FOREIGN PATENT DOCUMENTS

EP  1630588 A1  3/2006
EP  2910992 A1  8/2015
(Continued)

OTHER PUBLICATIONS

Moreno, Ignacio et al. "Ray matrix analysis of anamorphic fractional Fourier systems," Journal of Optics A: Pure and Applied Optics 8(5): 426-435 (2006).
Szoplik, Thomas et al. "Nonsymmetric Fourier transforming with an anamorphic system," Applied Optics 23(6): 905-909 (1984).
Zhang Hao, et al. "Elimination of zero-order beam induced by a pixelated spatial light modulator for holographic projection," Applied Optics 48(30): 5834-5841 (2009).
(Continued)

*Primary Examiner* — Jade R Chwasz
*Assistant Examiner* — Jyotsna V Dabbi
(74) *Attorney, Agent, or Firm* — McDonnell Boehnen Hulbert & Berghoff LLP (57) ABSTRACT

A display system includes a data provider, a spatial light modulator and a second cylindrical lens. The data provider is arranged to provide holographic data comprising first data corresponding to a first cylindrical lens having optical power in a first direction. The spatial light modulator is arranged to receive the holographic data, wherein the spatial light modulator is arranged to spatially-modulate received light in accordance with the holographic data. The second cylindrical lens is arranged to receive spatially-modulated light from the spatial light modulator and perform a one-dimensional Fourier transform of the received light in a second direction orthogonal to the first direction.

25 Claims, 4 Drawing Sheets

(51) Int. Cl.
*G03H 1/22* (2006.01)
*G02B 3/06* (2006.01)

(52) U.S. Cl.
CPC ......... *G02B 3/06* (2013.01); *G03H 2001/085* (2013.01); *G03H 2001/221* (2013.01); *G03H 2001/2207* (2013.01); *G03H 2223/12* (2013.01); *G03H 2223/21* (2013.01); *G03H 2223/55* (2013.01); *G03H 2225/32* (2013.01); *G03H 2225/52* (2013.01)

(58) Field of Classification Search
CPC ............. G03H 1/16; G03H 1/22–2205; G03H 1/2294; G03H 1/26; G03H 1/10; G03H 2001/306; G03H 2001/0816; G03H 2001/085–0858; G03H 2001/0875–0883; G03H 2001/2207–221; G03H 2001/2215; G03H 2001/2218; G03H 2001/2297; G03H 2210/20; G03H 2210/441; G03H 2225/32–34; G03H 2225/52; G03H 2240/00–11; G03H 2240/13; H04N 8/74; G02B 27/52; G02B 27/0101; G02B 3/06; G11B 7/0065; G11C 13/042
USPC ............................................................ 359/9
See application file for complete search history.

(56) References Cited

U.S. PATENT DOCUMENTS

| | | | |
|---|---|---|---|
| 8,120,996 B2 | 2/2012 | Noehte | |
| 2010/0165429 A1* | 7/2010 | Buckley | G02B 26/06 359/9 |
| 2014/0355985 A1* | 12/2014 | Chu | G02F 1/292 398/49 |
| 2015/0219980 A1* | 8/2015 | Saito | G02B 5/3091 349/123 |

FOREIGN PATENT DOCUMENTS

| | | |
|---|---|---|
| GB | 2482065 A | 1/2012 |
| WO | 2003/021341 A2 | 3/2003 |
| WO | 2017/131649 A1 | 11/2007 |
| WO | 2010/142737 A1 | 12/2010 |
| WO | 2012/007762 A1 | 1/2012 |
| WO | 2012/123715 A1 | 9/2012 |

OTHER PUBLICATIONS

International Search Report and Written Opinion for PCT/GB2017/050586, dated Jun. 19, 2017.
Combined search and examination report for GB1603697.2, dated Jan. 30, 2017.

* cited by examiner

DISPLAY SYSTEM

This application is a national stage application under 35 U.S.C. § 371 of International Application No. PCT/GB2017/050586, filed Mar. 3, 2017, which claims priority to Great Britain Patent Application No. 1603697.2, filed Mar. 3, 2016, the disclosures of which are explicitly incorporated by reference herein.

FIELD

The present disclosure relates to a display device. More specifically, the present disclosure relates to a display system arranged to form a holographic reconstruction of an image. Embodiments relate to a phase-only holographic display system and a method to effectively manage zero-order light. Embodiments relate to holographic image display systems and methods, and some embodiments relate to head-up display systems.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The "hologram" may be reconstructed by illuminating it with suitable light to form a holographic reconstruction, or replay image, representative of the original object.

It has been found that a holographic reconstruction of acceptable quality can be formed from a "hologram" containing only phase information related to the original object. Such holographic recordings may be referred to as phase-only holograms. Computer-generated holography may numerically simulate the interference process, using Fourier techniques for example, to produce a computer-generated phase-only hologram. A computer-generated phase-only hologram may be used to produce a holographic reconstruction representative of an object.

The term "hologram" therefore relates to the recording which contains information about the object and which can be used to form a reconstruction representative of the object. The hologram may contain information about the object in the frequency, or Fourier, domain.

A computer-generated phase-only hologram may be "pixelated". That is, the phase-only hologram may be represented on an array of discrete phase elements. Each discrete element may be referred to as a "pixel". Each pixel may act as a light modulating element such as a phase modulating element. A computer-generated phase-only hologram may therefore be represented on an array of phase modulating elements such as a liquid crystal spatial light modulator (SLM). The SLM may be reflective meaning that modulated light is output from the SLM in reflection.

Each phase modulating element, or pixel, may vary in state to provide a controllable phase delay to light incident on that phase modulating element. An array of phase modulating elements, such as a Liquid Crystal On Silicon (LCOS) SLM, may therefore represent (or "display") a computationally-determined phase-delay distribution. If the light incident on the array of phase modulating elements is coherent, the light will be modulated with the holographic information, or hologram. The holographic information may be in the frequency, or Fourier, domain.

Alternatively, the phase-delay distribution may be recorded on a kinoform. The word "kinoform" may be used generically to refer to a phase-only holographic recording, or hologram.

The phase delay may be quantised. That is, each pixel may be set at one of a discrete number of phase levels.

The phase-delay distribution may be applied to an incident light wave (by illuminating the LCOS SLM, for example) and reconstructed. The position of the reconstruction in space may be controlled by using an optical Fourier transform lens, to form the holographic reconstruction, or "image", in the spatial domain. Alternatively, no Fourier transform lens may be needed if the reconstruction takes place in the far-field.

A computer-generated hologram may be calculated in a number of ways, including using algorithms such as Gerchberg-Saxton. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only holographic representation of an object may be calculated.

The holographic reconstruction may be formed by illuminating the Fourier domain hologram and performing an optical Fourier transform, using a Fourier transform lens, for example, to form an image (holographic reconstruction) at a reply field such as on a screen.

Figures 1, 2:
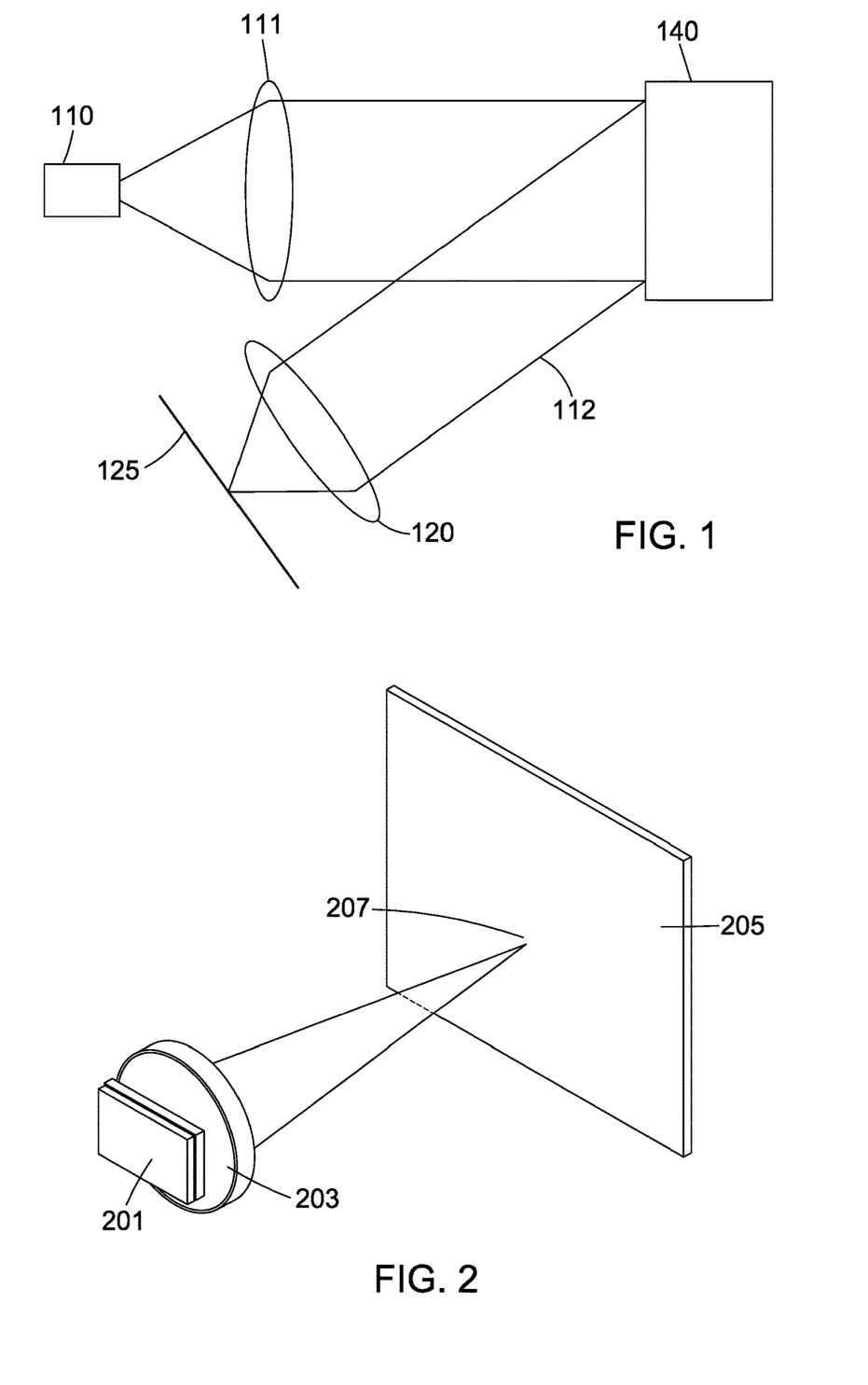
FIG. 1 is a schematic showing a reflective SLM, such as a LCOS, arranged to produce a holographic reconstruction at a replay field location.
FIG. 2 depicts a system for providing holographic reconstruction, in accordance with the present disclosure, using a Fourier transform lens.

FIG. 1 shows an example of using a reflective SLM, such as a LCOS-SLM, to produce a holographic reconstruction at a replay field location, in accordance with the present disclosure.

A light source 110, for example a laser or laser diode, is disposed to illuminate the SLM 140 via a collimating lens 111. The collimating lens causes a generally planar wavefront of light to become incident on the SLM. The direction of the wavefront is slightly off-normal (e.g. two or three degrees away from being truly orthogonal to the plane of the transparent layer). The arrangement is such that light from the light source is reflected off a mirrored rear surface of the SLM and interacts with a phase-modulating layer to form an exiting wavefront 112. The exiting wavefront 112 is applied to optics including a Fourier transform lens 120, having its focus at a screen 125.

The Fourier transform lens 120 receives a beam of phase-modulated light exiting from the SLM and performs a frequency-space transformation to produce a holographic reconstruction at the screen 125 in the spatial domain.

In this process, the light—in the case of an image projection system, the visible light—from the light source is distributed across the SLM 140, and across the phase modulating layer (i.e. the array of phase modulating elements). Light exiting the phase-modulating layer may be distributed across the replay field. Each pixel of the hologram contributes to the replay image as a whole. That is, there is not a one-to-one correlation between specific points on the replay image and specific phase-modulating elements.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

A holographic projector may be provided using such technology. Such projectors have found application in head-up displays for vehicles and near-eye devices, for example.

Image projection using light passing through kinoforms, and through spatial light modulators simulating dynamic kinoforms is a subject of interest for a number of reasons. One of the advantages of such imaging is that the technique is highly efficient since much of the light used to irradiate the kinoform finds its way to the projected image.

A spatial light modulator (SLM) may be configured such that the pixels form an array of phase-modulating elements that collectively represent a phase-only Fourier transform of a desired image, which, can be reconstructed by correctly illuminating the SLM, to form a projector. The phase-only distribution may be referred to as a hologram. The projected image may be described as the holographic reconstruction. The individual modulating elements of the SLM may be referred to as pixels.

There is however, a difficulty with phase-only, pixilated, spatial light modulators in that they exhibit well-known problems of zero-order or DC order light. Such zero-order light can be regarded as "noise" and includes for example specularly reflected light, and other light that is not-diffracted by the patterns on the spatial light modulator.

Normally to cause the holographic reconstruction to be formed at a known distance a Fourier lens, a lens whose function is to carry out an optical Fourier transform over a known path length, is inserted after the spatial light modulator (as shown in FIG. 2).

The Fourier lens acts upon not only the phase modulated light but also all the non-diffracted light causing it to come to a focus at the centre of an image, this bright point of light is known as the zero order or DC order. This DC order is problematic as the accumulation of all the unmodulated light in to such a small area could be potentially dangerous to the viewer, it will also likely be damaging to the contrast of the image due to backscatter of light in to the optical path.

FIG. 2 depicts a liquid crystal on silicon, "LCOS", spatial light modulator 201 arranged to "display" a hologram. Spatially modulated light from the LCOS SLM is received by a Fourier lens 203 to form a holographic reconstruction area 205 including a DC spot 207 concentrated at the focal length of the Fourier lens 203.

There is disclosed in WO 2007/131649, a method to filter this DC order from the image thereby enabling high quality holographic reconstructions. Although the previously disclosed method is effective, the filtering aperture needs to be very small to be effective, this in turn requires very precise mechanical alignment which adds cost and complexity to the design of a projector.

An alternative method of managing zero/DC order light is to not utilise a physical Fourier lens, but to combine a phase only lens with the holographic data distribution on the spatial light modulator. The collimated nature of the illuminating light source prevents the DC order from forming in to a very small spot. The amount energy in the DC order is unchanged, however, it is spread over a wider area and is therefore less problematic. The size of the DC order is normally the same size as the spatial light modulator, by blocking this unwanted light, a high quality image may be achieved (see FIG. 3).

Figure 3:
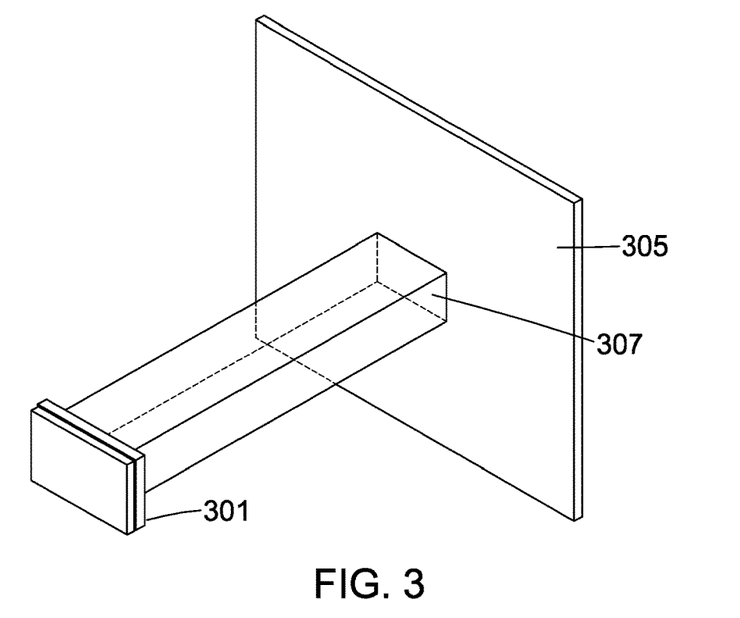
FIG. 3 depicts a system in which the Fourier transform lens is a phase-only lens provided by the SLM.

FIG. 3 depicts a LCOS SLM 301 arranged to "display" a hologram including phase-only lens data arranged to perform the Fourier transform. A physical Fourier lens is not therefore required. In this example, the DC spot 307 is a reflection of the LCOS SLM 301 on the holographic reconstruction area 305.

It may be appreciated that as the spatial light modulator may be quite large in area, that this renders a significant proportion of the holographic reconstruction area unusable.

The size of the holographic reconstruction (I) is given by:—

$$I[x, y] = 2 \cdot f \cdot \tan\left(\sin^{-1}\left(\frac{\lambda}{2 \cdot p[x, y]}\right)\right) \quad (1)$$

Where:—
f Fourier path length as defined by the phase only lens.
λ Wavelength of light
p Size of the pixel on the SLM.
For example in a holographic projector where:—
f=300 mm
Green (λg)=532 nm
p[x,y]=8 um
The holographic reconstructions will be 19.96 mm×19.96 mm.

If the spatial light modulator has 1920×1080 pixels, the zero order size will be:—

[Zero Order]_x=1920·p=15.36 mm

[Zero Order]_y=1080·p=8.64 mm

Figure 4:
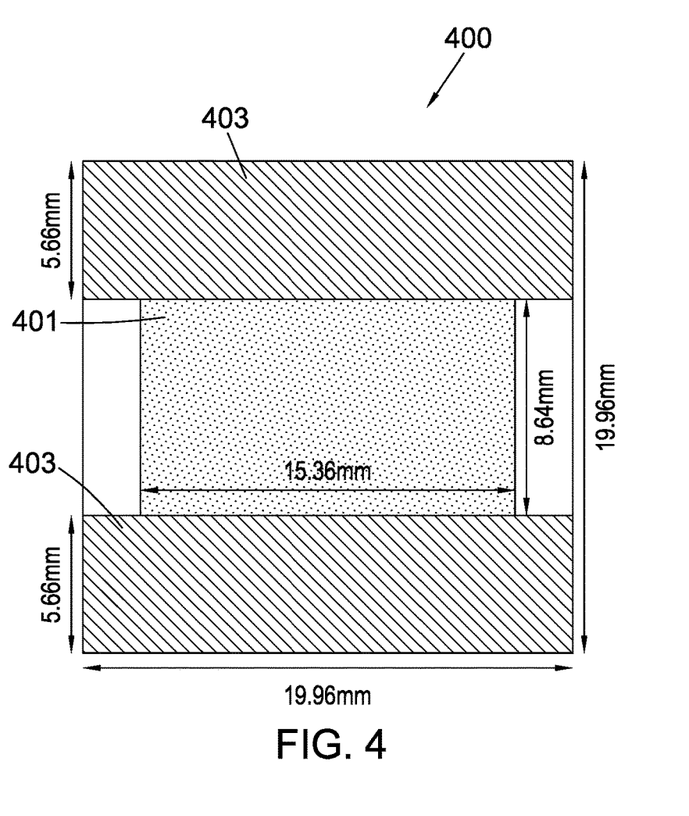
FIG. 4 shows a problem with the system shown in FIG. 3.

In this example, the usable area of the holographic reconstruction is shown in FIG. 4.

FIG. 4 shows a holographic reconstruction area 400 in accordance with examples in which the usable display area 403 is restricted by a large DC/zero order 401.

Clearly having two 5.66 mm display areas is not an efficient use of the display area. It can also be understood that the percentage of the holographic reconstruction area taken up by the zeroth order will decrease as the Fourier path length increases.

Figure 5:
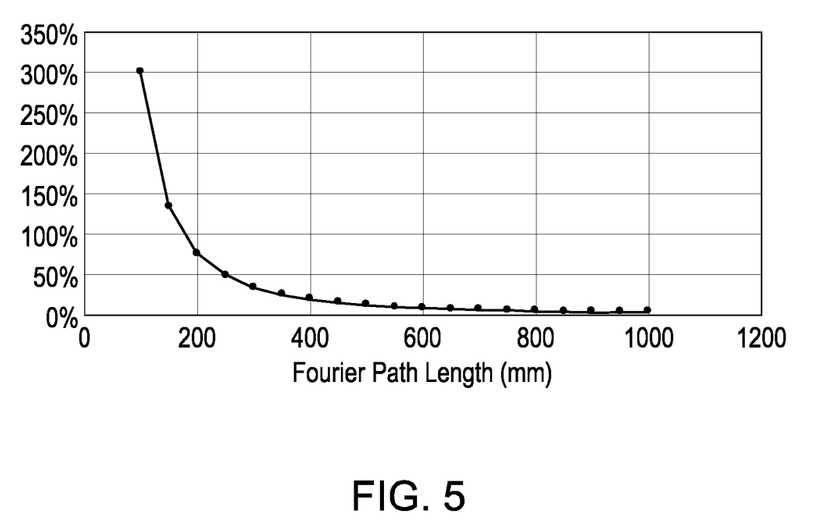
FIG. 5 shows the effect of the focal length of the Fourier lens (x-axis) on the percentage of the holographic reconstruction area which is taken up by the zeroth order (y-axis)

For a spatial light modulator with 1920×1080 and 8 um pixels illuminated with green light (532 nm), FIG. 5 shows the percentage area that the zeroth order occupies as a function of path length.

More specifically, FIG. 5 shows the effect of the focal length of the Fourier lens (x-axis) on the percentage of the holographic reconstruction area which is taken up by the zeroth order (y-axis).

Although it is possible to build a holographic projector that utilised this method of zeroth order filtering, it requires a long Fourier path length to deliver a sufficiently large holographic reconstruction to be useable, this is impractical for many projection systems.

The present disclosure addresses at least these problems.

SUMMARY

Aspects of an invention are defined in the appended independent claims.

There is provided a holographic display system comprising a cylindrical lens to carry out a 1-dimensional optical Fourier Transform and an orthogonally configured phase only cylindrical lens that, when combined with hologram data and applied to a spatial light modulator combines to produce a 2D holographic reconstruction;

Phase only cylindrical lens data in the same axis as the physical cylindrical lens may be combined with cylindrical phase only lens data orthogonal to the physical lens, to cause the holographic reconstruction to form at a different distance to the zeroth order.

A zero order block may be placed at the focal length of the cylindrical lens.

The spatial light modulator may be a reflective LCOS spatial light modulator.

The spatial light modulator may compensate for aberrations in the physical cylindrical lens.

The optical power of the phase only lens may be user controlled.

The display system may comprise a near-eye display.

The display may be part of a HUD.

The replay fields may be spatially remote from the viewer.

The display system may further comprise a spatial filter configured to selectively block at least one diffraction order of the 2D holographic reconstruction and, optionally, the zero order.

The virtual images may be a sequential frames of a 2D video.

The pixilated array may consist of pixels having a diameter less than 15 μm.

The improved device in accordance with the present disclosure has a number of significant advantages:
- the DC (or zero) order laser light has been minimised in area in one axis, allowing the maximum possible area of the holographic reconstruction to be used without causing a high intensity spot to form;
- a zero order removal system as described in WO 2007/131649 may still be employed however the mechanical alignment tolerance in one axis has been relaxed by virtue of using a phase only lens;
- differing phase only lens powers may be used to cause the holographic reconstruction to be formed at some distance from the DC order line. In particular, negative phase only lens power in the same axis as the physical cylindrical lens may be combined with positive phase only lens power in the orthogonal axis;
- it will be understood by an expert in the field of optical design that cylindrical lenses tend to be of simpler design and therefore offer worse aberration performance when compared with conventional lenses. These aberrations may be compensated for by the phase only lensing data that is added to the hologram data.

In overview, the present disclosure relates to an improved method for performing a 2D Fourier transform of a hologram represented on a spatial light modulator which better manages the zero-order. There is described herein a device arranged to perform a 2D Fourier transform by carrying out a first 1D Fourier transform using holographic data on an spatial light modulator and a second 1D Fourier transform, in the orthogonal direction, using a physical optic. In this respect, there is described a hybrid system using the combination of software and a physical optic to perform the required 2D Fourier transform for holographic projection.

A distinction is drawn between the disclosed hybrid system and using two physical optics (namely, cylindrical lenses) to spread zero-order light in two-dimensions. Notably, if two physical cylindrical optics are used, the zero-order diffracted light from the spatial light modulator will be spread in two orthogonal directions. Such an approach is not appropriate for image projection because it is more intrusive on the holographic replay field. However, the zero-order light is not affected by the first 1D Fourier transform of embodiments because that transform is performed by the pixels of the spatial light modulator and the zero-order light corresponds to light which is not subject to modulation by the pixels. Specifically, the zero-order results from the reflection of light off the structure between pixels. Therefore, with the disclosed hybrid device, only the physical cylindrical lens affects the zero-order which therefore forms a line which is much easier to manage. Accordingly, the present disclosure provides a method for performing the 2D Fourier transform necessary for holographic reconstruction which better manages the zero-order light.

In some embodiments, the hologram is calculated using an algorithm based on the Gerchberg-Saxton algorithm such as described in British patent 2,498,170 or 2,501,112 which are hereby incorporated in their entirety by reference. However, some embodiments relate to Fourier holography and Gerchberg-Saxton type algorithms by way of example only. The present disclosure is equally applicable to Fresnel holography and holograms calculated by other techniques such as those based on point cloud methods.

The term "hologram" is used to refer to the recording which contains amplitude and/or phase information about the object. The term "holographic reconstruction" is used to refer to the optical reconstruction of the object which is formed by illuminating the hologram. The term "replay field" is used to refer to the plane in space where the holographic reconstruction is formed. The terms "image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

In some embodiments, the spatial light modulator is a phase-only spatial light modulator. These embodiments are advantageous because no optical energy is lost by modulating amplitude. Accordingly, an efficient holographic projection system is provided. However, the present disclosure may be equally implemented on an amplitude-only spatial light modulator or an amplitude and phase modulator. It may be understood that the hologram will be correspondingly phase-only, amplitude-only or fully-complex.

The term "light" is used herein in its broadest sense. Some embodiments are equally applicable to visible light, infrared light and ultraviolet light, and any combination thereof.

Reference is made to holographic data comprising first data and second data to reflect that the holographic data is formed by the combination (such as vector addition) of first holographic data which collectively provide a lensing effect to received light and second holographic data which corresponds to the image. In some embodiments described herein, each data is a 2D array of data values. The first data may be said to collectively provide a lensing effect to received light because its effect on received light is the same as that of a physical lens. Examples are given in the detailed description of how this may be achieved. The first data may be computationally-determined (or "software-defined") to provide any conceivable lensing effect or function—such as positive optical power, negative optical power or aberration correction, for example. In some embodiments disclosed herein, the first data functions as a 1D Fourier transform lens. That is, it manipulates received light in the same way as an appropriately-positioned 1D Fourier transform optic such as a physical cylindrical lens. In some such embodiments, the first data perform an optical Fourier transform of the second data. The second data may be said to correspond to the image because it contains information sufficient to form—such as recreate or reconstruct—the image. In some embodiments described herein, the second data may be said to correspond to an image because it is a frequency (or Fourier) domain representation of the image. In this respect, it may be understood that the holographic data comprises a first component responsible for providing a first optical function (i.e. a Fourier transform) and a second component responsible for providing a second optical function (i.e. modulating light with data corresponding to the image).

The term "software-defined" (or "software-controllable") is used to reflect that the data is computational data or software data which may be changed or varied—including changed or varied in real-time—using software running on a computer. In this respect, the data may be considered dynamically-variable or simply "dynamic".

Some embodiments describe 1D and 2D holographic reconstructions by way of example only. In other embodiments, the holographic reconstruction is a 3D holographic reconstruction. That is, in some embodiments, each computer-generated hologram forms a 3D holographic reconstruction.

BRIEF DESCRIPTION OF THE DRAWINGS

Specific embodiments, based on the technology described above, will follow, by way of example only. It will be appreciated that routine variations can be made to alter the specific details provided herein. The examples are described with reference to the accompanying drawings, in which.

In the figures like reference numerals referred to like parts.

DETAILED DESCRIPTION OF THE DRAWINGS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Light is incident across the phase-modulating layer (i.e. the array of phase modulating elements) of the SLM. Modulated light exiting the phase-modulating layer is distributed across the replay field. Notably, in the disclosed types of holography, each pixel of the hologram contributes to the whole reconstruction. That is, there is not a one-to-one correlation between specific points on the replay field and specific phase-modulating elements.

The position of the holographic reconstruction in space is determined by the dioptric (focusing) power of the Fourier transform lens or lenses. In embodiments, a 1D Fourier transform is performed by a physical lens. That is, a lens which is an optical 1D Fourier transform lens arranged to perform a 1D Fourier transform optically. Any lens can act as a Fourier transform lens but the performance of the lens will limit the accuracy of the Fourier transform it performs. The skilled person understands how to select a lens and use that lens to perform an optical Fourier transform in 1D or 2D. In embodiments, a 1D Fourier transform is also performed computationally by including 1D lensing data in the holographic data. That is, the hologram includes data representative of a lens as well as data representing the object. It is known in the field of computer-generated hologram how to calculate holographic data representative of a lens. The holographic data representative of a lens may be referred to as a software-defined lens or software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In embodiments, a physical lens is used in conjunction with a software lens to perform the Fourier transform. In further embodiments, the hologram may include grating data—that is, data arranged to perform the function of a grating such as beam steering. Again, it is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

The inventors have recognised that it is advantageous to utilise a hybrid physical cylindrical Fourier lens and phase only lens system to manage the DC order. In particular, by utilising a physical cylindrical lens, that is to say a lens that has optical power in one axis only, the zero order light can be caused to come to a focus as a line. The DC order line will have a very small size in one axis, and will be the same size as the spatial light modulator in the other axis. As the light energy is spread in this way, in reduces the issues and potential contrast problems. The present disclosure is equally applicable to phase-modulation, amplitude-modulation and fully-complex modulation.

Figure 6:
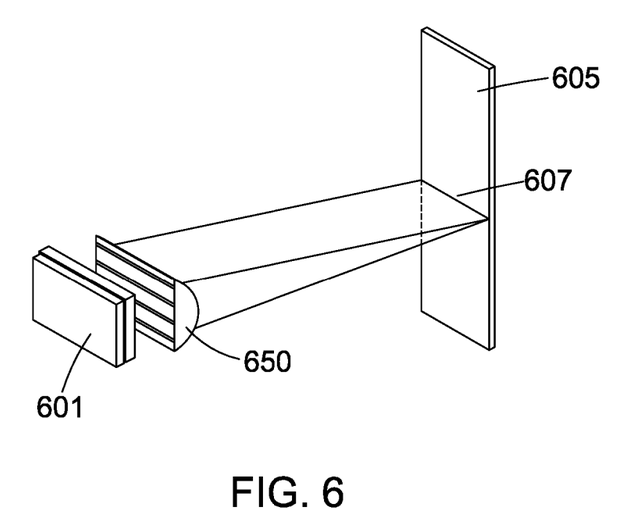
FIG. 6 depicts use of a physical cylindrical Fourier lens.

The axis in which the physical optical power exists will form a 1-dimensional holographic reconstruction; this however is insufficient to form the entire image as shown in FIG. 6.

FIG. 6 shows an example comprising a physical cylindrical Fourier lens only. There is depicted a LCOS SLM 601 which has been illuminated to form a DC spot 607 spread in one-direction only on the holographic reconstruction area 605 using a cylindrical Fourier lens 650. The DC order 607 may be said to be one-dimensional. The holographic reconstruction area may be said to be diffracted in one-dimensional only. That is, a complete two-dimensional holographic reconstruction is not formed. The DC spot 607 is the width of the Fourier lens.

Figure 7:
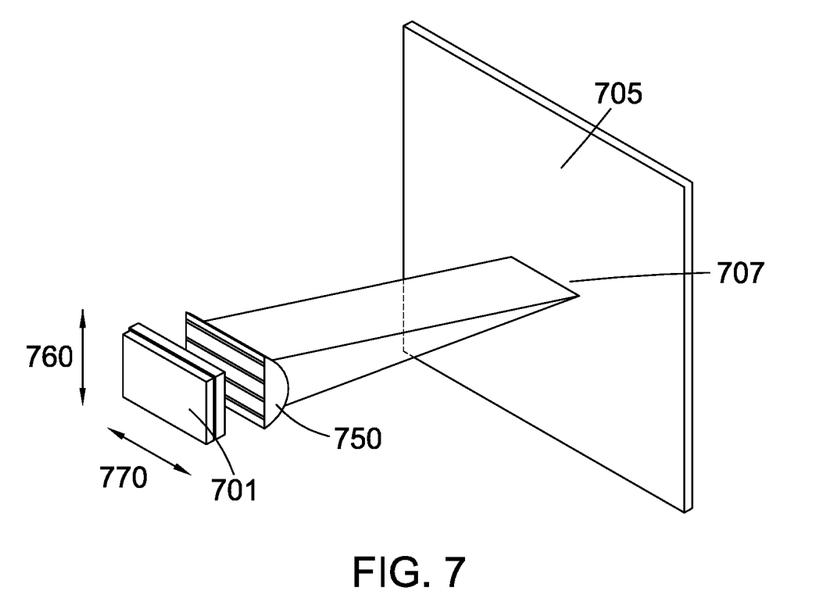
FIG. 7 shows a first embodiment.

However, the inventors have recognised that by adding a phase only cylindrical lens power, orthogonal with respect to the physical lens, to the hologram data will enable the entire image to form correctly as shown in FIG. 7. In this respect, it may be appreciated that the inventors have provided a hybrid system for improved zero-order removal.

FIG. 7 shows an embodiment comprising a physical cylindrical and phase-only Fourier lens. There is depicted a LCOS SLM 701 which has been illuminated to form a DC spot 707 spread in one-direction only on the holographic reconstruction area 705 using a cylindrical Fourier lens 750. The DC spot 707 may be said to be one-dimensional. The DC spot 707 is the width of the Fourier lens. The combined effect of the physical lens 750 acting in the direction 760 and the phase-only lens acting in the direction 770 causes a two-dimensional Fourier transform. In some embodiments, the holographic reconstruction area 705 is formed on a light-receiving surface—such as a screen or diffuser.

There is therefore provided a display system comprising: a data provider arranged to provide holographic data comprising first data corresponding to a first cylindrical lens having optical power in a first direction; a spatial light modulator arranged to receive the holographic data, wherein the spatial light modulator arranged to spatially-modulate received light in accordance with the holographic data and a second cylindrical lens arranged to receive spatially-modulated light from the spatial light modulator and perform a one-dimensional Fourier transform of the received light in a second direction orthogonal to the first direction.

It will be appreciated that a first one-dimensional lens is provided computationally as a hologram on the spatial light modulator and a second one-dimensional lens is provided as a physical optic, wherein the lenses are respectively arranged to perform orthogonal Fourier transforms. The person skilled in the art will understand how to orientate the two cylindrical lenses to perform the two orthogonal 1D transforms described. In embodiments, the two cylindrical lenses are orthogonal. In embodiments, the first 1D lens has optical power in only a first direction and the second 1D lens has optical power in only a second direction, wherein the first direction and second direction are orthogonal. This display system may be used to form a reconstruction of a hologram provided on the spatial light modulator. The holographic information corresponding to the image for reconstruction is combined with the hologram providing the first one-dimensional lens. It may therefore be understood that, in embodiments, the holographic data further comprises second data corresponding to an image for holographic reconstruction.

It may be said that the holographic data comprises two components: a first component representative of the image for holographic reconstruction; and a second component arranged to provide one-dimensional lensing. The two components may be combined by vector addition such as addition. It may not therefore be immediately apparent that the holographic data has been formed from two components but it will be appreciated that lensing data has been combined with image-content data to provide a lensing effect. The first data of the holographic data may be said to provide first cylindrical lensing. In embodiments, the holographic data comprises a vector addition of the first data and the second data.

In embodiments, the second cylindrical lens is arranged to form a two-dimensional holographic reconstruction of the image at a replay plane.

In embodiments, the SLM is a liquid crystal on silicon spatial light modulator such as a reflective LCOS SLM. In other embodiments, the SLM is transmissive or a MEMs based SLMs. In embodiments, the SLM is phase-modulating only (i.e. not amplitude-modulating). In embodiments, the spatial light modulator comprises a plurality of pixels. Each pixel may be individually addressed to provide a phase-delay to light incident on that pixel. Each pixel may be described as being a phase-delay element. It may be said that the spatial light modulator comprises an array of individually-addressable phase-delay elements. In embodiments, each pixel has a diameter less than 15 μm.

In advantageous embodiments, the second cylindrical lens is a physical optic.

The data provider may be computational means arranged to calculate the holographic data or memory arranged to store the holographic data.

In embodiments, the data provider is further arranged to receive user input which determines the optical power of the first cylindrical lens. That is, the optical power of the first cylindrical lens may be user-controlled or software-controlled.

In embodiments, the holographic data further comprises a third data component corresponding to a third cylindrical lens having optical power in the second direction. This is advantageous because it causes the holographic reconstruction to form at a different distance to the zeroth order. This is shown in FIG. 8.

Figure 8:
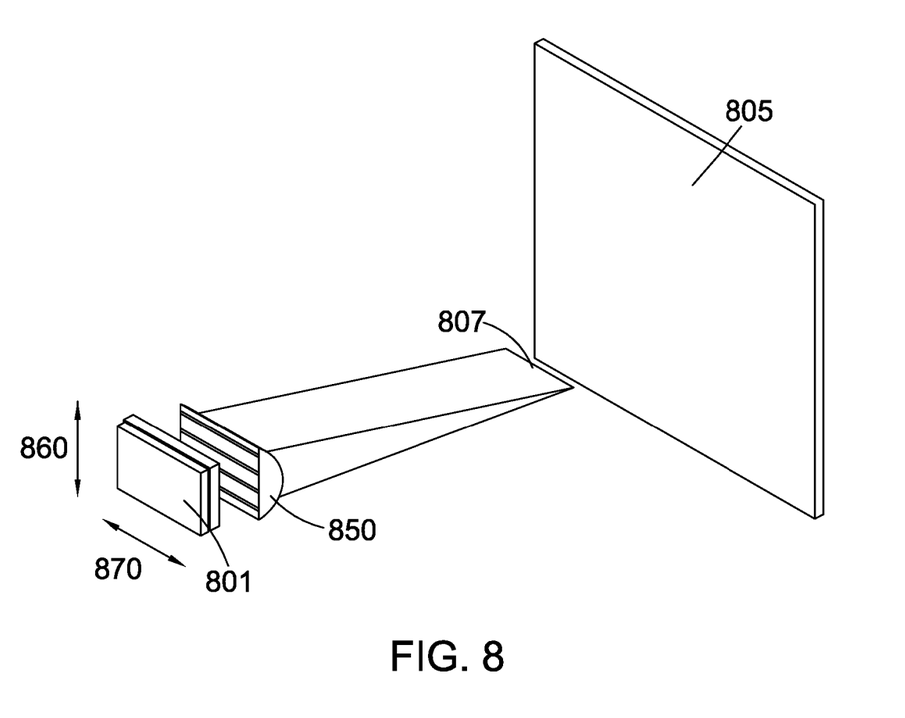
FIG. 8 shows a second embodiment.

FIG. 8 shows a further advantageous embodiment comprising a physical cylindrical lens and a phase-only Fourier lenses. There is depicted a LCOS SLM 801 which has been illuminated to form a DC spot 807 spread in one-direction only on the holographic reconstruction area 805 using a cylindrical Fourier lens 850. The DC spot 807 may be said to be one-dimensional. The DC spot 807 is the width of the Fourier lens. A one-dimensional Fourier transform in a first direction 860 is provided by a physical lens and a phase-only lens. A one-dimensional Fourier transform in a second direction 870, perpendicular to the first direction, is provided by a phase-only lens. It may be seen that the DC spot 807 is formed away from the holographic reconstruction area 805. The DC spot (or zeroth order) may be even more easily removed from the system because it is spatially separated from the reconstruction plane. In some embodiments, this is achieved by adding optical power to the software lens of the hologram so as to displace the modulated light without displacing the zero-order light—thereby causing spatial displacement of the zero-order from the reconstruction plane. In some embodiments, the holographic reconstruction area 805 is formed on a light-receiving surface—such as a screen or diffuser.

The data provider may be further arranged to receive user input which determines the optical power of the third cylindrical lens. That is, the optical power of the third cylindrical lens may be user-controlled or software-controlled.

In embodiments, the holographic data further comprises a fourth data component arranged to compensate for aberrations in the second cylindrical lens.

There is therefore provided an improved display system which allows the zero order light from the spatial light modulator to be easily removed. Embodiments therefore comprise a spatial filter arranged to block zero-order light from the spatial light modulator. The spatial filter may be described as being a zero-order block. The skilled person will understand that the zero-order block may take a variety of different physical forms. For example, the zero-order block may be an edge or reflective aperture or light dump.

In embodiments, the spatial filter is positioned at the focal length of the second cylindrical lens to provide convenient removal of zero-order light from the system.

Embodiments relate to phase-only holography and phase-only spatial light modulation. In embodiments, the holographic data comprises phase-only information. It may be said the holographic data represents a phase-delay distribution or the holographic data is in the frequency domain. However, the present disclosure is not limited to phase-only holography and in other embodiments, the spatial light modulator alternatively or additionally performs amplitude modulation.

In embodiments, the first data component is a phase-only representation of the Fresnel transform of the image. In some embodiments, the first data component is representative of the image in the frequency domain. However, the present disclosure is not limited in this respect. In embodiments, the first data component is a phase-only representation of the Fourier transform of the image The present disclosure may be used to form a still image or a video image such as a real-time video image. In embodiments, each holographic reconstruction is one frame of a sequence of 2D video frames.

Advantageously, the replay plane may be arranged to be spatially remote from a viewer of the holographic reconstruction. There may therefore be provided a near-eye device or head-up display, for example, comprising the display system in accordance with the present disclosure. The present disclosure may be used to form a monochromatic or colour display.

In embodiments, the display system further comprises a light source arranged to illuminate the pixels of the spatial light modulator. In embodiments, light source is a (spatially) coherent light source such as laser. In some embodiments, the display system comprises a plurality of light sources arranged to provide a composite colour holographic reconstruction.

In some embodiments, the holographic projection system of the present disclosure is used to provide an improved head-up display (HUD) or head-mounted display or near-eye device. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

The invention is not restricted to the described embodiments but extends to the full scope of the appended claims.

The invention claimed is:

1. A display system comprising:
   a data provider arranged to provide holographic data comprising first data providing a first cylindrical lens effect having optical power in a first direction and second data corresponding to an image for holographic reconstruction;
   a spatial light modulator arranged to receive the holographic data, wherein the spatial light modulator is arranged to spatially-modulate received light in accordance with the holographic data; and
   a second cylindrical lens arranged to receive spatially-modulated light from the spatial light modulator and perform a one-dimensional Fourier transform of the received light in a second direction orthogonal to the first direction, wherein the second cylindrical lens is a physical optic configured to focus the spatially-modulated light and zero-order light received from the spatial light modulator,
   wherein the first cylindrical lens effect and second cylindrical lens are arranged to form a two-dimensional holographic reconstruction of the image at a replay plane.

2. The display system of claim 1, wherein the holographic data comprises a vector addition of the first data and the second data.

3. The display system of claim 1, wherein the spatial light modulator comprises a plurality of pixels.

4. The display system of claim 3, wherein the each pixel has a diameter less than 15 µm.

5. The display system of claim 1, wherein the data provider is computational means arranged to calculate the holographic data.

6. The display system of claim 1, wherein the data provider is memory arranged to store the holographic data.

7. The display system of claim 1, wherein the data provider is further arranged to receive user input which determines the optical power of the first cylindrical lens effect.

8. The display system of previously presented claim 1, wherein the holographic data further comprises a third data component corresponding to a third cylindrical lens effect having optical power in the second direction.

9. The display system of claim 8 wherein the data provider is further arranged to receive user input which determines the optical power of the third cylindrical lens effect.

10. The display system of claim 1, wherein the holographic data further comprises a fourth data component arranged to compensate for aberrations in the second cylindrical lens.

11. The display system of any preceding claim 1, further comprising a spatial filter arranged to block zero-order light from the spatial light modulator.

12. The display system of claim 11 wherein the spatial filter is positioned at the focal length of the second cylindrical lens.

13. The display system of claim 1, wherein the holographic data comprises phase-only information.

14. The display system of claim 1, wherein the first data is a phase-only representation of the Fresnel transform of the image.

15. The display system of claim 1, wherein the first data is a phase-only representation of the Fourier transform of the image.

16. The display system of claim 1, wherein the spatial light modulator is a liquid crystal on silicon spatial light modulator.

17. The display system of claim 1, wherein each holographic reconstruction is one frame of a sequence of 2D video frames.

18. The display system of claim 1, wherein the replay plane is arranged to be spatially remote from a viewer of the holographic reconstruction.

19. A near-eye device or head-up display comprising the display system according to claim 1.

20. The display system of claim 1, wherein the holographic data does not comprise a data component corresponding to a cylindrical lens having optical power in the second direction.

21. The display system of claim 1, wherein the spatial light modulator is modulated in accordance with the holographic data.

22. The display system of claim 1, wherein the spatial light modulator and the second cylindrical lens are arranged to form a substantially one-dimensional line of the zero-order light at the replay plane.

23. A method for displaying a two-dimensional holographic reconstruction of an image at a replay plane, the method comprising:
   providing holographic data comprising first data providing a first cylindrical lens effect having optical power in a first direction and second data corresponding to the image for holographic reconstruction;
   receiving the holographic data at a spatial light modulator arranged to receive the holographic data, and spatially-modulating light received at the spatial light modulator in accordance with the holographic data; and
   receiving spatially-modulated light and zero-order light from the spatial light modulator at a second cylindrical lens arranged to receive spatially-modulated light, and using the second cylindrical lens to focus and to perform a one-dimensional Fourier transform of the received light in a second direction orthogonal to the first direction, wherein the second cylindrical lens is a physical optic,
   wherein the first cylindrical lens effect and second cylindrical lens form the two-dimensional holographic reconstruction of the image at the replay plane.

24. The method of claim 23, wherein the zero-order light is formed as a substantially one-dimensional line at the replay plane.

25. The method of claim 24, further comprising blocking the substantially one-dimensional line of the zero-order light.

* * * * *